United States Patent [19]
Johnston

[11] Patent Number: 5,819,875
[45] Date of Patent: Oct. 13, 1998

[54] APPARATUS AND METHOD FOR APPLYING DRY LUBRICANT TO CARTRIDGE CASE NECKS

[76] Inventor: Roger B. Johnston, P. O. Box 427, Lafayette, Calif. 94549

[21] Appl. No.: 706,276

[22] Filed: Sep. 4, 1996

[51] Int. Cl.⁶ .................................................. F16N 1/00
[52] U.S. Cl. ........................ 184/100; 184/109; 427/11; 86/19; 118/76
[58] Field of Search ................... 118/76, 429; 427/11; 184/18, 20, 98, 99, 100, 101, 102, 109; 86/19, 36, 37, 23; 102/511

[56] References Cited

U.S. PATENT DOCUMENTS 3,259,519  7/1966  Physioc III ................. 184/102
5,273,782  12/1993  Sagawa et al. ................. 427/11

FOREIGN PATENT DOCUMENTS 0137056  10/1979  Japan ................................ 118/76
WO8907524  8/1989  WIPO ................................ 427/11

Primary Examiner—Thomas E. Denion
Attorney, Agent, or Firm—Medlen & Carroll, LLP

[57] ABSTRACT

An apparatus and method for conveniently and easily applying a dry sliding lubricant to the interior and exterior surfaces of a cartridge case neck prior to sizing is provided.

18 Claims, 4 Drawing Sheets

APPARATUS AND METHOD FOR APPLYING DRY LUBRICANT TO CARTRIDGE CASE NECKS

FIELD OF THE INVENTION

The present invention relates to the field of ammunition for firearms; and is more particularly directed to the problems associated with applying an adequate amount of lubricant to a cartridge case prior to loading the cartridge case with powder and inserting a bullet.

BACKGROUND OF THE INVENTION

A cartridge case for a firearm may generally be defined as having a body, a head into which an ignition primer is placed, and an area called the neck. The neck of a cartridge case is the area into which a projectile is placed or seated. The projectile is normally held in position by being forced into the cartridge case as an interference fit. Accordingly, the neck diameter is typically sized to be slightly smaller than the diameter of the desired projectile.

Most rifle, pistol, and cannon cartridge cases are formed from various brass or steel alloys through a press forging operation to exacting standards. The firearm's chamber is machined to minimum standards and the firearm's ammunition is manufactured to a maximum standard; this ensures that a properly fitted cartridge case will fit into a given firearm's chamber correctly. Upon firing, the heat and pressure of ignition and combustion of the propellant will expand the cartridge case to the internal dimensions of the firearm's chamber. Thus, the neck of a cartridge case typically expands during firing, to the diameter of the firearm's chamber, and remains at that larger diameter unless and until it is reformed.

After firing, because of their value, brass cartridge cases are often reloaded and reused. Before reloading and reusing, such fired cartridge cases are typically checked and reformed to their approximate original, pre-firing specifications, or they may be formed into new sizes and shapes as desired. This reforming and/or remanufacturing is done commercially as well as by numerous individual shooters and reloaders. This process of forming or reforming the cartridge case is called "sizing."

A cartridge case is sized by forcing it into a die of the desired shape and size, causing the cartridge case to be swaged to the correct size. When the cartridge case is forced into such a cylindrical forming die, a lubricant must generally be used.

There are two general methods of sizing. One method, called "full length sizing," uses a forming die slightly smaller than the intended finished size and one that will fit the defined chamber of the firearm, and resizes the entire length of the cartridge case. A slightly smaller size or resize die than the finished, desired dimensions is used because the cartridge case metal will spring back to a slightly larger size upon the cartridge case being removed from the full length sizing die.

A second, common method of resizing fired cartridge cases is called "neck sizing." In neck sizing, a forming die is used that will only size the cartridge case neck down to the desired diameter in preparation for insertion of the projectile. This method is used by many individual shooters when a cartridge case is being formed for use with one particular firearm, and is not going to be used with other firearms.

Common to both full length sizing and neck sizing is the necessity to remove the expended ignition primer from a fired cartridge case in preparation for inserting a new primer as part of the cartridge loading process. The primer is removed from the cartridge case by pushing the old primer out of the cartridge case. This process is called "decapping." A decapping pin is often mounted on the end of a rod, and this rod is frequently threaded into the center of a sizing die, to enable primer decapping during resizing.

A part of a conventional decapping pin/rod assembly is a section of the rod which is very precisely machined to expand the case neck up to the proper amount of interference fit when a projectile is inserted into the cartridge case. This section of a conventional decapping rod/pin assembly is known as an "expander ball." In order for the expander ball to smoothly pass through the case neck, it is necessary to lubricate the interior of the case neck with some kind of lubricant.

Most cartridge case lubricants are synthetic or petroleum based liquids. Dry lubricants are used occasionally, but hitherto have been generally avoided because of the difficulty in applying an appropriate amount to a desired area.

Lubrication for case resizing may be applied to the cartridge case by several methods. Conventional methods of lubrication include application by aerosol spray. However, aerosols can present breathing hazards to workers, and can often deposit too much lubricant or deposit lubricant in undesirable areas (such as, for example, inside the body of the cartridge case). Once resizing is completed, the cartridge case must be cleaned to remove any excess lubricant on the interior of the cartridge case to prevent contamination or malfunction of primer or propellant.

Lubrication can also be applied using a pad or piece of cloth containing lubricant. While this method solves the respiratory and other problems associated with airborne lubricants, it is a very messy method to use, and can only be used conveniently for lubricating the exterior of the cartridge case. To lubricate the interior of the neck, for example when an expander ball is to be passed into the cartridge case, a small brush or cotton tipped applicator is conventionally used. It is very difficult to control the amount of lubricant, and to prevent lubricant from flowing into the body of the cartridge case, when brushes or cotton tipped applicators are used.

Accordingly, the need exists for an apparatus and method for applying a controlled amount of lubricant to the interior and exterior of a cartridge neck for resizing, without the mess and health hazards associated with sprays, and with more control than is available with brush or cotton tipped applicators.

SUMMARY OF THE INVENTION

The present invention provides an apparatus and method for the dry lubrication of the interior and exterior of a cartridge case neck. The apparatus includes a container having a mixture of balls and dry sliding lubricant, the balls being no larger than half an inside diameter of the cartridge case neck and the container having an opening which is sufficiently larger than an outside diameter of the cartridge case neck to admit the entire cartridge case neck into the container and so that the balls and sliding lubricant will be contained in the neck and will surround the outside surface of the cartridge neck. When the neck is inserted to a predetermined depth into the mixture of dry lubricant and balls, and the cartridge case is rotated about its longitudinal axis, the dry lubricant, which is substantially equally distributed over the surface of each ball, is transferred from the balls to the interior and exterior surfaces of the cartridge neck, applying a sufficient, but controlled amount of dry lubricant.

BRIEF DESCRIPTION OF THE DRAWINGS

The objects, features and advantages of the present invention will become apparent to one skilled in the art from reading the following detailed description in which.

DETAILED DESCRIPTION OF THE INVENTION

Figure 1:
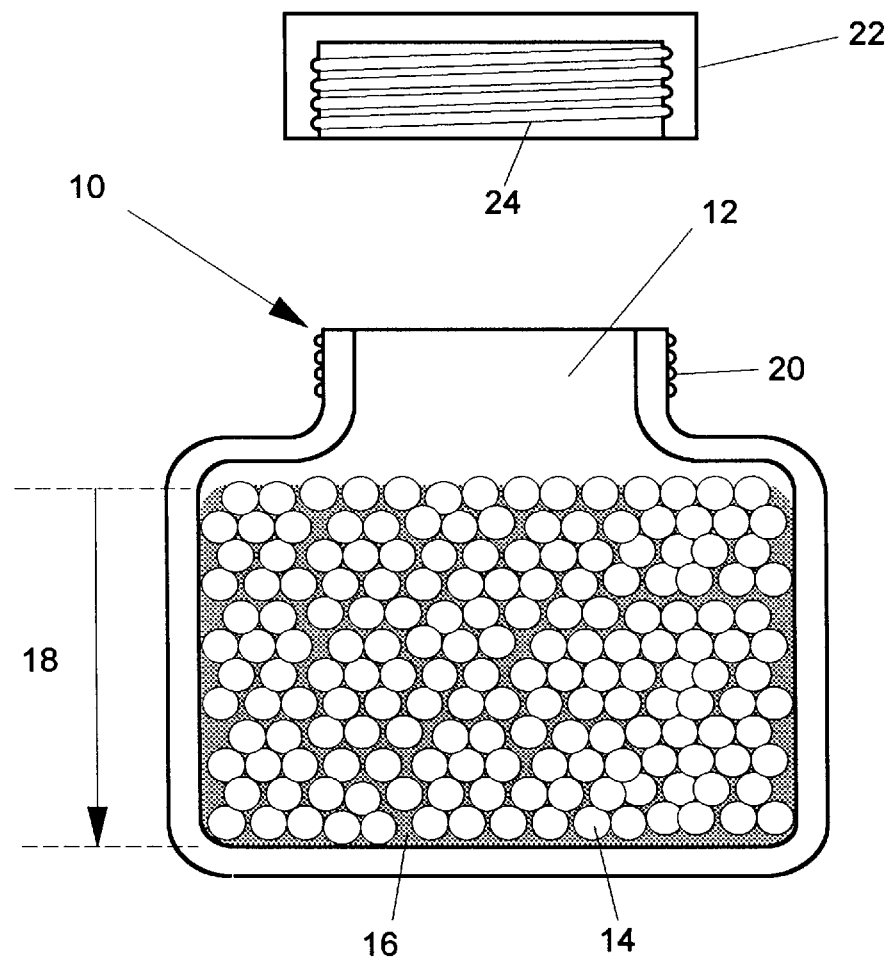
FIG. 1 provides a cross-sectional side view of a lubricating apparatus of the present invention.

As shown in FIG. 1, an apparatus of the present invention is constructed using a container 10 which has an opening 12 which is at least about 100% larger than the largest diameter of cartridge case neck to be lubricated. Into this container is placed a quantity of round or near round balls 14 and dry lubricant 16.

Balls 14 can be selected from a variety of materials. Any size of ball and ball hardness can be used so long as the balls will fit into the interior of the smallest cartridge case to be lubricated. However, I prefer to use stainless steel balls which are preferably no more than about one-half the inside diameter of the smallest cartridge case to be lubricated, and most preferably which are about 0.090 to about 0.100 inch in diameter, since these appear to provide the best range for servicing small arms cartridge cases for ammunition ranging from 0.170 inch diameter up to and including 0.500 inch diameter. Stainless steel balls are preferred because they work very efficiently and are corrosion resistant. Balls less dense than steel tend to rise to the top of the ball/lubricant mixture. Lead balls also work well, but because of possible health hazards, are not recommended. The balls should have a smooth surface, since rough surfaced balls can become wedged amongst each other inside a cartridge case neck.

Lubricant 16 is preferably a highly refined, fine grained particulate lubricant for sliding friction such as molybdenum disulfide ($MoS_2$). Highly refined, fine grained graphite can also be used. It is believed that other dry lubricants may, likewise, be useful in this invention but have not been tested. When this lubricant is added to a quantity of, for example, steel balls, it coats and surrounds the balls. When an object is inserted into and moved through the ball/lubricant mixture, the lubricant is transferred in a controlled manner from the steel balls to the object. As the steel balls rotate, any excess dry lubricant is moved through the mixture, recoating and redistributing the dry lubricant. As dry lubricant is exhausted through use, an additional amount of dry lubricant can be added to the balls to "recharge" the mixture. When recharging occurs, it is important to mix the balls and dry lubricant together to provide even distribution of the dry lubricant on the balls.

Container 10 can vary in size, depending upon the largest cartridge case to be lubricated. A wide diameter, low height container with a low center of gravity is preferred because it resists accidental upset. The container can be made from any material, but plastic containers are preferable because they are inexpensive and resistant to breakage when accidentally dropped. Opening 12 can be provided with a means for closure for protecting the ball/lubricant mixture from dust, dirt, moisture, or other contaminants when the lubricating apparatus is not in use. This means for closure can include a cork, or other friction fitting plug which can be inserted into opening 12 to close it off. More preferably, however, the means for closure is provided by forming threads 20 on the outside of said opening 12, which threads 20 engage cooperating threads 24 inside a closure cap 22. This provides a positively closed or sealed container, which can be inverted and shaken, if desired, for example, to redistribute any excess dry lubricant contained in the bottom of the container 10.

As noted above, the opening 12 is sized be at least about 100% larger than the largest cartridge case to be lubricated, so that the cartridge case neck will be surrounded both on the outside and inside by the ball/lubricant mixture. This sizing also provides a sufficient amount of ball/lubricant mix for the apparatus to be used many times before the lubricant must be recharged. The depth 18 of the container 10 can be selected to provide an automatic "stop" for limiting lubrication to only the neck of the cartridge case to be lubricated. Alternatively, the amount of ball/lubricant mixture can be adjusted so that when a cartridge case is inserted neck first through the opening 12 of the container 10, throught the ball/lubricant mixture to the bottom of the container 10, the ball/lubricant mixture extends only up into the neck of the cartridge case.

Figure 2:
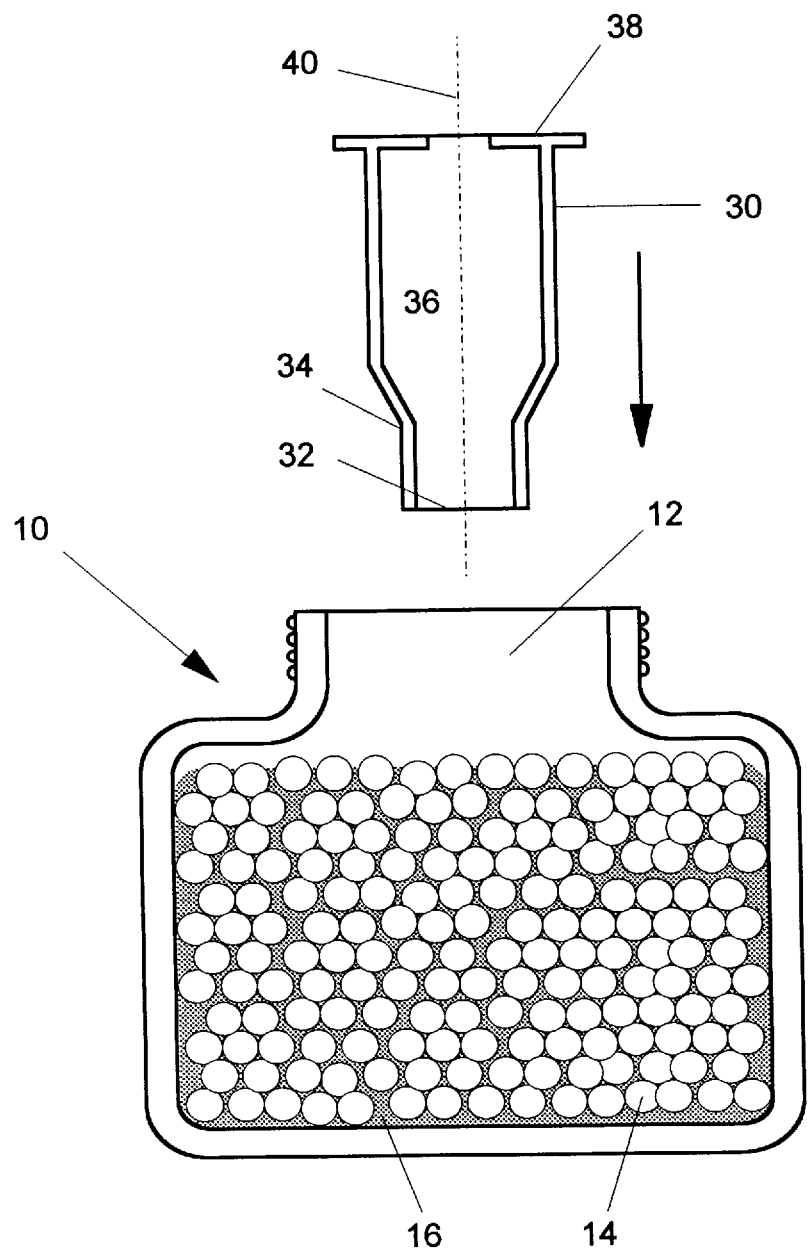
FIG. 2 provides a cross-sectional view of a lubricating apparatus of the present invention with a cartridge case positioned for insertion into the container having a mixture of balls and dry lubricant.

As shown in FIG. 2, to use the lubricating apparatus of the present invention, one needs only insert the cartridge case neck opening 32 substantially perpendicularly into the opening 12 of container 10 so that the ball/lubricant mixture enters the neck and surrounds the exterior of the cartridge neck. The user can insert the cartridge neck all the way to the bottom of the container 10 which preferably corresponds to the base of the neck 34, or may select a shallower depth if desired for a specific reloading application (e.g., if only a partial outside neck sizing is desired).

Figure 3:
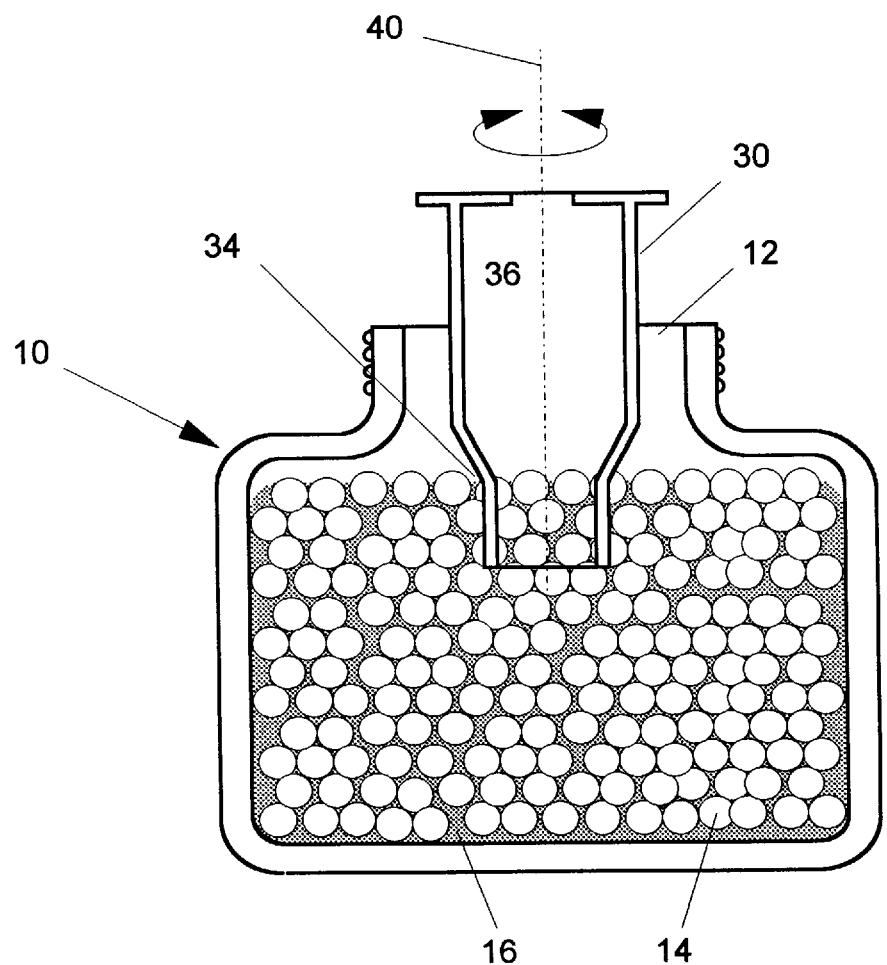
FIG. 3 provides a cross-sectional view of a lubricating apparatus of the present invention, with a cartridge case inserted into the container and mixture of balls and dry lubricant.

As shown in FIG. 3, while the cartridge case 30 is in the ball/lubricant mixture, the cartridge case 30 is rotated by hand about the longitudinal axis 40 extending through the center of the open neck 32 and the center of the base 38, so that the balls mechanically apply the lubricant to the interior and exterior surfaces of the neck.

Figure 4:
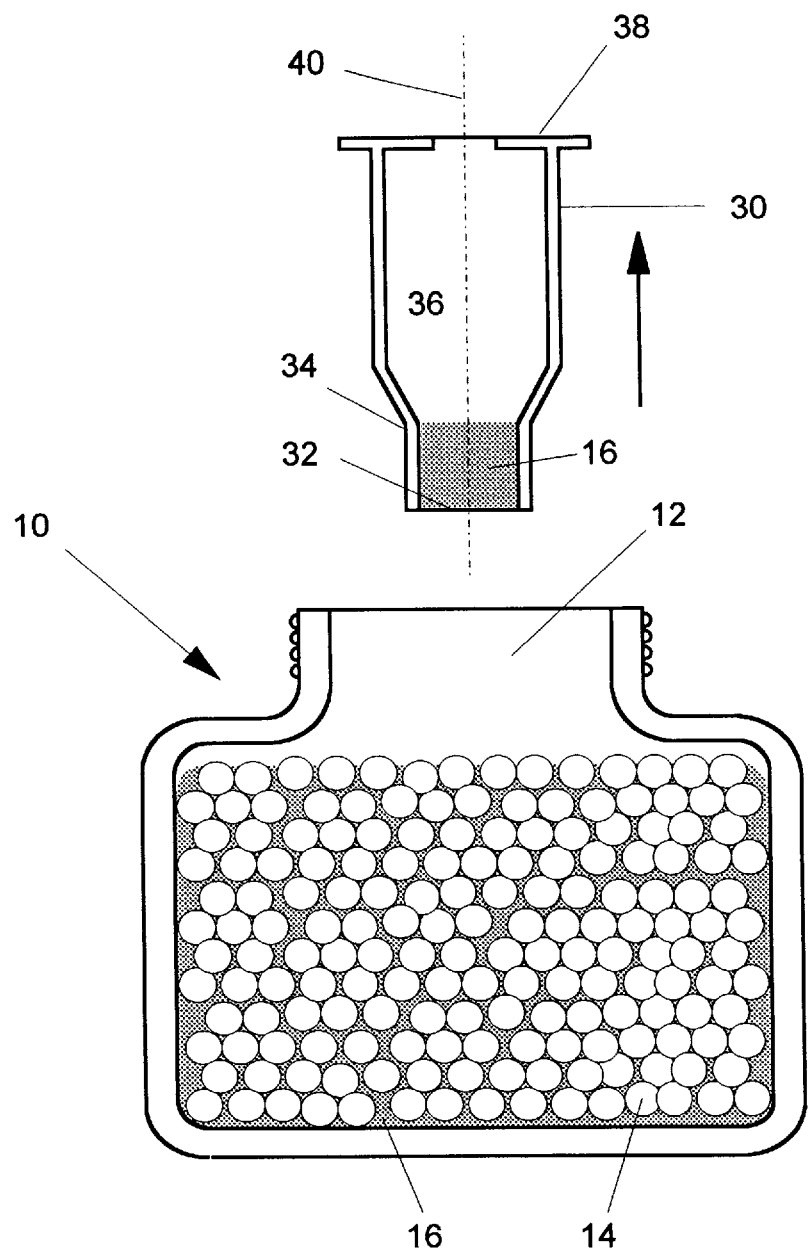
FIG. 4 provides a cross-sectional view of a lubricating apparatus of the present invention, with a cartridge case removed from the container and the mixture of balls and dry lubricant.

As shown in FIG. 4, the neck of the cartridge case is then removed substantially perpendicularly from the container 10, revealing the lubricant 16, which was applied by the action of the balls rubbing against the surfaces of the cartridge case as it was rotated, to the exterior and interior surfaces of the neck. The cartridge case can then be conventionally sized. After the cartridge case is sized, any excess lubricant on the exterior of the cartridge case is removed with a cloth or steel wool, as may be required. It is not necessary to remove the dry lubricant from the interior of the cartridge case since the amount used is insignificant and does not pose the same propellant contamination problems associated with liquid lubricants.

Example 1, which follows, illustrates an actual lubricating apparatus constructed according to the description set forth above.

EXAMPLE 1

A device of the present invention was constructed using a container having a height of 1⅛ inches, an opening diameter of 1¾ inches, a volume of about ½ ounce, and a lid which can be threaded on and off. About 1 ounce, by weight, of 0.090 inch diameter smooth steel balls was placed inside the container. Approximately ¼ ounce by weight of fine-grained Molybdenum Disulfide ($MoS_2$) was added to the container, and the lubricant/ball mixture was mixed to distribute the lubricant around the balls. This mixing was accomplished by threading the lid onto the container and gently shaking the container. The lid was removed. The finished level of ball/lubricant mixture in the container was approximately ¼ inch to ⅜ inch below the opening of the container. The neck of a cartridge case of approximately 0.17 inch inside diameter was inserted substantially perpendicularly through the top surface of the ball/lubricant mixture to the bottom of the container, so that the neck was surrounded by ball/lubricant mixture both inside and out. The case was rotated approximately three times about its longitudinal axis, which was held substantially perpendicular to the bottom surface of the container, after which the cartridge case was removed from the ball/lubricant mixture, substantially along this longitudinal axis. Upon examination, the neck was found to be coated sufficiently with lubricant, but without excess, for sizing. And a conventional sizing operation was carried out without problem. Following sizing, it was only necessary to remove lubricant from the outside of the cartridge case.

The invention has been described in terms of the preferred embodiment. One skilled in the art will recognize that it would be possible to construct the elements of the present invention from a variety of materials and to modify the placement of the components in a variety of ways. While the preferred embodiments have been described in detail and shown in the accompanying drawings, it will be evident that various further modifications are possible without departing from the scope of the invention as set forth in the following claims.

What is claimed is:

1. An apparatus for lubricating a neck portion of a cartridge case consisting essentially of:
   a container having a mixture of balls and dry sliding lubricant, said balls being no larger than half an inside diameter of the cartridge case neck and having a substantially smooth surface, said container having an opening and dimensions sufficient to admit only a portion of the cartridge case into said container, said portion including said neck portion, whereby only said neck portion of said cartridge case will be lubricated.

2. The apparatus of claim 1 wherein said balls are stainless steel.

3. The apparatus of claim 1 wherein said balls range in size from about 0.090 inches to about 0.100 inches.

4. The apparatus of claim 1 wherein said dry lubricant is a fine, particulate lubricant selected from the group consisting of Molybdenum DiSulfide and Graphite.

5. The apparatus of claim 1 wherein the ratio of balls to dry lubricant is approximately 4:1 by weight.

6. The apparatus of claim 1 wherein said container is plastic.

7. The apparatus of claim 1 wherein said container has a depth and said depth is equal to the distance from an opening of the cartridge neck to a base of the cartridge neck.

8. A method of lubricating a neck portion of a cartridge case having an open end, the neck portion extending from the open end to a neck base adjacent to a body of the cartridge case, said cartridge case having a longitudinal axis passing through the center of the opening and a center of a base of the cartridge case, said method comprising the steps of:
   placing balls and a dry, sliding lubricant into a suitable container, said container having an opening and dimensions sufficient to admit into said container only a portion of the cartridge case, said portion including the neck portion;
   mixing said balls and lubricant to substantially evenly distribute the dry lubricant over the surface of the balls;
   inserting the open end of the cartridge case substantially perpendicularly through the container opening and into the balls and lubricant so that the balls and lubricant extend into and around the the neck portion of the cartridge case;
   rotating by hand the portion of the cartridge case extending outside of said container about the longitudinal axis of the cartridge case;
   removing the neck portion of said cartridge case substantially perpendicularly from said balls and lubricant and out of said container.

9. The method of claim 8 wherein said balls are stainless steel balls having a diameter of from about 0.900 inch to about 0.100 inch.

10. The method of claim 8 wherein the ratio of balls to dry lubricant is about 4:1 by weight.

11. The method of claim 8 wherein said opening of said container is at least 100% larger than an outside diameter of said neck of said cartridge case.

12. The method of claim 8 wherein the predetermined depth is from the opening to the neck base.

13. An apparatus for lubricating a neck portion of a cartridge case, comprising:
   a container having an opening and dimensions sized to receive inside the container only the neck portion of the cartridge case;
   a quantity of dry lubricant disposed in said container; and,
   a means disposed in said container for transferring said dry lubricant to only said neck portion of said cartridge case said means for transferring said dry lubricant comprising a plurality of balls, each of which is sufficiently small to fit inside of said neck portion of said cartridge case and each of which has a substantially smooth, hard, curved surface.

14. The apparatus of claim 13 wherein said balls are stainless steel.

15. The apparatus of claim 14 wherein said balls range in size from about 0.090 inches to about 0.100 inches.

16. The apparatus of claim 13 wherein said dry lubricant is a fine, particulate lubricant selected from the group consisting of Molybdenum Disulfide and Graphite.

17. The apparatus of claim 13 wherein the ratio of balls to dry lubricant is approximately 4:1 by weight.

18. The apparatus of claim 13 wherein said container is plastic.

* * * * *